Patented Oct. 20, 1953

2,656,340

UNITED STATES PATENT OFFICE 2,656,340

AROMATIC-ALKENE COPOLYMERS OF LESS THAN 5 PER CENT AROMATIC CONTENT

William J. Sparks, Westfield, and David W. Young, Roselle, N. J., assignors to Standard Oil Development Company, a corporation of Delaware No Drawing. Application July 27, 1950, Serial No. 176,256

10 Claims. (Cl. 260—88.1)

This invention relates to novel high molecular weight polymeric chemical products and to methods of making same. More particularly, it relates to the preparation of copolymers consisting almost entirely of aliphatic constituents but containing a very small amount of a combined cyclic modifying constituent. The invention may be typified by a copolymer of 97% of isobutylene and 3% of styrene.

U. S. Patents 2,213,423 and 2,274,749 disclose copolymers of isobutylene and styrene in a general way, and describe methods of effecting the copolymerization, i. e. at temperatures below 0° C., e. g. −10° C., −40° C., −80° C., or lower, and by the use of an active halide polymerization catalyst. These patents disclose that the proportions of the two reactants may be varied in order to produce thermoplastic copolymers having the desired hardness, melting point, plasticity, etc., and that the proportion of olefin used, e. g. isobutylene, may range from 1 to 90%, the balance of 10-99% by weight being styrene or equivalent polymerizable cyclic compound. However, it is difficult or impossible to prepare such copolymers in a very high molecular weight range such as 50,000, 100,000 or above, and another difficulty is that when any such copolymers having molecular weights even as low as 10,000 are dissolved in paraffinic lubricating oils they tend to come out of solution when cooled down to temperatures of about 50° F. or lower. Furthermore, although when compounded with natural or synthetic rubber, such copolymers greatly improve the workability thereof, they generally effect a slight reduction either in tensile strength or in elongation.

It is also known that isobutylene alone can be polymerized to polymers ranging from viscous sticky fluids having a molecular weight range of 1,000 to 10,000 or 15,000, on up through a tacky plastic stage, to dry substantially non-tacky rubbery polymers having molecular weights of 150,000 and even much higher. However, such polybutenes, particularly those of very high molecular weights, do not have as good stability to sunlight and ultraviolet light as might be desired, and do not have entirely satisfactory stability against thermal or mechanical molecular weight breakdown.

It has now been found that between the pure polybutenes and the styrene-isobutylene copolymers having 5 or 10 or more per cent of combined styrene, it is possible to make novel copolymers having novel and unexpected characteristics not possessed by either of the two previously known types of polymeric materials. Thus, it is found that when about 0.5 or 1% up to about 4 or 4.5% or so of styrene is copolymerized with isobutylene, the resultant copolymers have surprisingly better thermal stability than polybutene, and it is believed that the small amount of styrene combined in the copolymer molecule acts somewhat like an anti-oxidant in preventing depolymerization or molecular weight breakdown at elevated temperature, which is thought to be at least partly due to or at least accelerated by incipient oxidation, because known oxidation inhibitors such as certain alkyl phenols tend to reduce the thermal decomposition of high molecular weight polybutenes.

These new copolymers may be milled into natural rubber or synthetic rubbers such as GR-S (butadiene-styrene), GR-A (butadiene-acrylonitrile), and GR-I (isobutylene-isoprene copolymer of low unsaturation), as well as other types such as neoprene, and organic polysulfide rubbers, at hot mill temperatures such as 150–330° F., with less undesirable breakdown than can polybutene of similar molecular weight.

These new copolymers having less than 5% of combined styrene or equivalent cyclic constituent, may be made in a wide range of molecular weights, according to the temperature of copolymerization used and the particular type of catalyst used. However, the invention is applied to particular advantage by effecting the copolymerization at temperatures below −50° C. so the resulting copolymers will have a molecular weight (by the Staudinger method) of at least 30,000 and preferably at least 50,000. With previously used high percentages of styrene in the copolymer it has been difficult or impossible to obtain products having molecular weights higher than about 30,000 or 40,000. For instance, if a mixture of 40% of styrene and 60% of isobutylene is copolymerized at −103° C. in methyl chloride solution and using as catalyst a solution of aluminum chloride dissolved in methyl chloride, the resulting copolymer will have a molecular weight of about 25,000, and if the proportion of reactants is reversed so as to use 60% of styrene in the feed, the copolymer will have only 18,000 to 20,000 mol. wt., whereas under similar copolymerization conditions copolymers having less than 5% of combined styrene are made having molecular weights ranging from about 70,000 up to 200,000. These new copolymers when made in the very high molecular weight range such as 150,000 to 200,000 or higher are dry, rubbery products having no cold flow. They resemble polybutene in general physical texture and appearance except that for any particular molecular weight they have a physical texture corresponding more closely to a polybutene having a molecular weight about 25% higher.

Another remarkable characteristic of these new copolymers is that they have quite gradual heat-softening characteristics much more resembling pure polybutene than the more sharply thermoplastic type of heat softening properties of styrene-isobutylene copolymers having larger amounts of combined styrene.

The copolymers of this invention also have an unexpectedly good combination of good solubility in paraffinic lubricating oils even at very low temperatures, e. g. 0° F., and good stability under shear tests. An indication that the combined styrene content of these new copolymers is critically important even though small in quantity, is that these copolymers are found to dissolve in benzene to form a clear solution at 20° C. whereas polybutenes of similar molecular weight do not. Another characteristic which may be particularly valuable under certain circumstances, is that the copolymers of this invention generally have a much narrower molecular weight spread than isobutylene polymers made under similar polymerization conditions of temperature, type of catalyst and solvent.

In carrying out the copolymerization, the catalyst to be used may be aluminum chloride, boron fluoride, or activated boron fluoride containing 0.1% of ether, titanium tetrachloride, aluminum alkoxide-aluminum chloride complex (AlCl₃.Al [OC₂H₅]₃), AlBr₃.AlBr₃.Al(OC₂H₅)₃, (AlBr₃)₄.AlOBr and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include AlCl₃.AlCl₂OH, AlBr₃.AlBr₂OH, AlBr₂Cl.AlOCl
AlBrCl₂.AlOBr, TiCl₄AlCl₂OH, TiOCl₂.TiCl₄
AlBr₃.Br₂.CS₂, AlBr₃.Br₄.CS₂

BF₃-isopropyl alcohol complex, BF₃ solution in ethylene, activated BF₃ catalyst in ethylene solution.

The copolymerization is preferably carried out in the presence of a volatile solvent or diluent or refrigerant, such as propane, ethane, ethylene, methyl chloride, carbon dioxide (liquid or solid), etc.; such materials may be used either as internal refrigerants or external refrigerants or both, to remove the liberated heat of polymerization. One advantage of the present invention is that due to the use of less than 5% of styrene or equivalent cyclic constituent, both the feed materials and resulting copolymers are sufficiently soluble in lower aliphatic hydrocarbon solvents such as propane, that it is not necessary to use a lower alkyl halide solvent such as methyl chloride as is required for copolymerizations involving higher amounts of styrene reaction.

After completion of the copolymerization, residual catalyst may be hydrolyzed by adding an alcohol, for example, isopropyl alcohol or ethyl alcohol, or water or both, and removed by washing the product with water and preferably also with dilute aqueous caustic soda. Any residual solvent or wash water or other hydrolyzing agents may be removed by heating the copolymer with or without milling, kneading or other agitation.

Instead of isobutylene as the alkene, other lower aliphatic olefins may be used, preferably iso-olefins having 4 to 8 carbon atoms such as iso-pentene (methyl-2 butene-1), or a normal pentene obtained by dehydration of secondary amyl alcohol, although other lower olefins such as propylene may also be used.

Instead of styrene as the polymerizable olefinic cyclic compound, other materials may be used, such as alpha-methyl styrene, para-methyl styrene, alpha-para-dimethyl styrene, dihydronaphthalene, indenes, etc. Various derivatives or homologues of such compounds having one or more short alkyl groups (e. g. 1 to 10 carbon atoms) attached to the cyclic nucleus and not interfering with the polymerization, may be used.

The proportions to be used in making up the copolymerization feed stock may vary somewhat according to the intended purpose. Usually, the polymerizable mono-olefinic hydrocarbon containing a cyclic nucleus, e. g. styrene or equivalent material, should be used in a concentration or at least 0.01% but less than 5% by weight, preferably about 0.5% to 4.5% and better still for most purposes about 1.0 to 4.0%. The aliphatic olefin such as isobutylene will constitute the remainder of the active copolymerization feed and it will be present in a concentration greater than 95% and may be as great as 99.99%. It is found that even relatively minute amounts, much less than 1%, of styrene, when copolymerized with isobutylene, have a very beneficial effect in stabilizing the polybutene chain against depolymerization due to sunlight, ultraviolet light, heat and oxidation.

The preferred procedure for carrying out the copolymerization of this invention is to mix the isobutylene and styrene, or their equivalents, cool them down to the desired operating temperature by either external or internal refrigeration, preferably having some diluent or solvent present, for instance in a proportion of about 1 to 5 volumes of solvent per volume of mixed copolymerization feed, and then adding to that reaction mixture the desired amount of catalyst or solution thereof, preferably agitating the mixture well during the addition of the catalyst.

After hydrolysis and removal of catalyst as previously mentioned, the resultant high molecular weight copolymer may be heated if desired, with or without milling or other agitation, to remove residual traces of solvent, diluent or refrigerant or of water or alcohol left from the washing step.

The copolymer per se is a plastic, and in most cases rubbery and elastic, solid having an average Staudinger molecular weight above 30,000, and preferably above 50,000. Molecular weights well above 300,000 have been obtained. Copolymers having a molecular weight below 50,000 generally are somewhat tacky, while those in the vicinity of 100,000 mol. wt. are only very slightly tacky and those in the vicinity of 150,000 or 200,000 are dry and free from cold flow. Generally, according to this invention, a substantially saturated copolymer is produced, i. e. having less than about 0.1 iodine number and being substantially free from tendencies to absorb oxygen and harden due to aliphatic unsaturation.

The isobutylene-styrene type copolymer can be cured through the presence of the benzene ring by reagents such as formaldehyde, or acetyl peroxide, heptoyl peroxide, etc.

The copolymers of this invention may be used for a wide variety of purposes in addition to those mentioned above. For instance they may be used for coating metal, wood, paper, cloth, glass, and for laminating various thin flexible sheet material such as paper cloth, metal foil, regenerated cellulose, cellulose acetate etc., and for such purposes the copolymers may be dissolved in a volatile solvent such as naphtha, and applied by various conventional methods such as dipping, spraying, roll coating, etc., followed by evaporation of the solvent, or the copolymers may be compounded with softening or plasticizing materials such as mineral oils, waxes, e. g. paraffin wax or petrolatum, asphalt or thermoplastic compatible resins preferably of the hydrocarbon type, and when thus softened or plasticized, may be used in molten or heat-softened condition for any of the purposes above-mentioned.

These products also are particularly well adapted for electrical insulation purposes, particularly for dielectric medium, alone or together with paraffin wax, in electrical condensers.

These products may also be compounded with other types of high molecular weight polymeric materials, preferably those of predominate aliphatic nature such as polybutene, polyethylene and other polymerized olefins, as well as synthetic rubber of the GR-I type, e. g. made by low temperature Friedel-Crafts polymerization of isobutylene with about 1 to 3% of isoprene, although they may also be compounded with natural rubber and other types of synthetic rubber such as those made by emulsion polymerization of butadiene alone or in together with a minor proportion of styrene or acrylonitrile.

The copolymers of this invention are miscible with molten paraffin wax in all proportions, and therein differ greatly from styrene-isobutylene copolymers having a higher styrene content, e. g. 10 to 60% or so.

These copolymers having less than 5% of styrene or other cyclic constituent can also be used as viscosity index improvers in lubricating oils, diesel fuels or even gasoline.

Another valuable characteristic of this invention is that these new copolymers lend themselves very peculiarly to the formation of many new chemical derivatives because the very small proportion of styrene or other cyclic constituent combined into the copolymer makes these products susceptible to reaction with strong acids such as sulfuric acid, nitric acid, as well as to other chemical agents such as halogenation, oxidation, sulfurization, treatment with phosphorus sulfides, e. g. $P_2S_5$, alkylation, e. g. with amyl chloride, acylation, e. g. by acetyl chloride, sebacyl chloride, phthalyl chloride, as well as other interlinking resinifying agents, e. g. formaldehyde, ethylene dichloride, chlorinated paraffin wax, etc.

The invention will be better understood from a consideration of the following experimental data.

EXAMPLE 1

A copolymerization feed was formulated from 97% by weight of isobutyl and 3% of styrene. To this mixed feed, powdered solid carbon dioxide was added to cool the mixture to −78° C. and then boron fluoride gas was bubbled slowly into the mixture with stirring. Copolymer formed at a very rapid rate. The product had a molecular weight of about 33,000 and the yield was about 47%. The copolymer was soluble in benzene at temperatures as low as 20° C., whereas polybutene of the same molecular weight came out of solution at 20° C.

EXAMPLE 2

A copolymer was prepared from an olefinic feed containing 98% by weight of isobutylene and 2% by weight of styrene, this mixture being copolymerized at a temperature of −101° C. in the presence of 3 volumes of methyl chloride as solvent per volume of polymerizable feed, and using as catalyst $AlCl_3$ in methyl chloride (0.6 g./100 ml.). The resulting copolymer had an average mol. wt. of about 100,000, by Staudinger method, and was a substantially tack-free, flexible, substantially colorless rubbery solid. 20 parts by weight of this copolymer were compounded with 80 parts by weight of natural rubber smoked sheet and other compounding and curing ingredients as listed herebelow and then cured at 285–287° F. For comparison a composition identical except for the omission of the isobutylene-styrene copolymer, was similarly compounded and cured. The abrasion resistance and flex-resistance of the resulting products after curing for various periods from 5 mins. to 20 mins. are also shown herebelow:

*Table I*

| Recipe No. | 1 | 2 |
|---|---|---|
| Ingredients: | | |
| Smoked sheet | 100 | 80 |
| Kosmobile 66 (carbon black) | 50 | 50 |
| Pine tar | 4 | 4 |
| B. L. E. powder (antioxidant) | 1 | 1 |
| Zinc oxide | 5 | 5 |
| Stearic acid | 3.5 | 3.5 |
| Captax [1] | 0.8 | 0.8 |
| D. P. G. (diphenylguanidine) | 0.2 | 0.2 |
| Sulfur | 3 | 3 |
| Copolymer [2] | | 20 |
| Abrasion Resistance (ASTM D394–40) | | |
| Mins. cure at 285–287° F.: | | |
| 5 | 241 | 319 |
| 10 | 193 | 219 |
| 15 | 161 | 197 |
| 20 | 192 | 196 |
| Flex Resistance to #10 cracking (modif. of ASTM D813–44T) | | |
| Mins. cure at 285° F.: | | |
| 5 | 175,000 | 300,000 |
| 10 | 400,000 | 680,000 |
| 15 | 100,000 | 780,000 |
| 20 | 75,000 | 425,000 |

[1] Mercapto-benzothiazole.
[2] Isobutylene-styrene copolymer of 100,000 mol. wt. and containing 2% combined styrene.

The above data show that the incorporation of 20% of the 2% styrene type copolymer of isobutylene and styrene effected a slight increase in the abrasion resistance of the compounded cured rubber, and effected a tremendous improvement in its flex resistance.

EXAMPLE 3

Styrene is soluble in a mixture of 1 volume of isobutylene and 3 volumes of liquid ethane, to the extent of about 3% by weight. A series of tests were made in which a mixture of 2.5% by weight of styrene and 97.5% by weight of isobutylene was copolymerized in the presence of 3 volumes of liquid ethane per volume of liquid copolymerization feed, using gaseous $BF_3$ as catalyst, either alone or together with 0.1% of ether (diethyl ether) as accelerator. The molecular weights of the resulting copolymers are shown in the following table:

Table II

| Test No. | Accelerator | Mol. Wt. |
| --- | --- | --- |
| 1 | None | 10,680 |
| 2 | do | 13,350 |
| Aver | | 12,015 |
| 3 | 0.1% Ether | 35,190 |
| 4 | do | 44,500 |
| 5 | do | 36,140 |
| 6 | do | 50,230 |
| Aver | | 41,515 |

The polymerization temperature was about —88° C.

The above Table II shows that when gaseous boron fluoride alone is used as catalyst for copolymerizing isobutylene containing about 2.5% by weight of styrene, the resulting copolymer has a molecular weight only about 10,000 to 15,000, whereas when the $BF_3$ is supplemented by the use of 0.1% of ether as accelerator, the molecular weight of the resulting copolymer ranges from about 35,000 to 50,000. This is a surprisingly good result considering that the copolymerization was carried out in the presence of only a hydrocarbon material, namely ethane, as solvent and refrigerant, because styrene has such a low solubility in aliphatic hydrocarbons at low temperature that generally a halogenated hydrocarbon liquid such as methyl chloride has been used heretofore in copolymerizing styrene-isobutylene mixtures containing higher amounts of styrene, e. g. 20 to 60% or so.

EXAMPLE 4

Another series of tests was made to determine the optimum amounts of $BF_3$ catalyst and butane diluent, for copolymerizing 1% by weight of styrene with 99% of isobutylene using 0.1% of ethyl ether to activate the $BF_3$ catalyst and using solidified carbon dioxide as internal refrigerant, which therefore maintains a copolymerization temperature of about —78° C. The conditions of polymerization used in each test, and the molecular weight of the resulting copolymer are given in the following Table III.

Table III

[Solid $CO_2$ refrigerant—0.1% ethyl ether added to olefin feed; active feed—99% isobutylene-1% styrene.]

| Percent Butane Diluent | Percent $BF_3$ Catalyst | Staudinger Mol. Wt. |
| --- | --- | --- |
| 0 | 1 | 92,000 |
| 10 | 1 | 105,000 |
| 20 | 1 | 115,000 |
| 40 | 1 | 112,000 |
| 60 | 1 | 98,000 |
| 80 | 1 | 75,000 |
| 0 | 3 | 95,000 |
| 10 | 3 | 120,000 |
| 20 | 3 | 132,000 |
| 40 | 3 | 120,000 |
| 60 | 3 | 98,000 |
| 80 | 3 | 75,000 |

The above data in Table III show that when 0.1% ether activator is used, copolymers ranging from 75,000 to about 95,000 mol. wt. are obtained with 1 to 3% of $BF_3$ catalyst and without any butane diluent, but copolymers having higher molecular weights in the range of 100,000 to 130,000 are obtained with similar concentrations of $BF_3$ but with 10 to 50% by weight of butane diluent.

EXAMPLE 5

Another series of tests similar to those in Example 4 in regard to the copolymerization of 1% of styrene with 99% of isobutylene, was made to determine the optimum amount of ether activator for the $BF_3$ catalyst. These tests were carried out using ethane as refrigerant but no heavier material such as butane as diluent. The use of ethane as an internal refrigerant maintained a copolymerization temperature of about —89° C. The various proportions of ether activator used, ranging from 0 to 0.4% by weight based on the weight of polymerization feed, and the amounts of $BF_3$ used ranging from 1 to 3% and the molecular weights of the resulting copolymers are shown in the following table:

Table IV

[Polymerization of 99% isobutylene-1% styrene feed with $BF_3$ activated catalyst. Ethane refrigerant (3 vol. ethane per vol. active feed.)]

| Percent ethyl ether in feed | Percent $BF_3$ | Staudinger Mol. Wt. |
| --- | --- | --- |
| 0.1 | 1 | 110,000 |
| 0.2 | 1 | 140,000 |
| 0.3 | 1 | 165,000 |
| 0.4 | 1 | 145,000 |
| 0.1 | 2 | 111,000 |
| 0.2 | 2 | 160,000 |
| 0.3 | 2 | 197,000 |
| 0.4 | 2 | 140,000 |
| 0.1 | 3 | 170,000 |
| 0.2 | 3 | 220,000 |
| 0.3 | 3 | 250,000 |
| 0.4 | 3 | 190,000 |

The above data in Table IV show that when 1% of styrene is copolymerized with 99% of isobutylene using ethane refrigerant at —89° C. and using 0.1 to 0.4% of ether activator for the $BF_3$ catalyst, copolymers of highest molecular weight were obtained with 0.3% of ether activator, and with this concentration of activator, 1% of $BF_3$ gave a copolymer of 165,000 mol. wt., 2% of $BF_3$ gave 197,000 and 3% gave 250,000. Using 3% of $BF_3$ but no ether activator the molecular weight obtained was only 58,000. Also, it may be noted that the 1% styrene type copolymerization is more sensitive to catalyst activation by ether than are copolymerizations using higher amounts of styrene, such as 20%.

EXAMPLE 6

Copolymers having about 2% of combined styrene and 98% isobutylene, were made having two different average molecular weight ranges, one about 12,000 and the other about 78,000. These copolymers were then blended in several concentrations up to 40% by weight in a paraffin wax having a melting point of about 135° F. All of these blends were completely homogeneous even at temperatures well above the melting point of the wax, showing good solubility of the copolymers of such low styrene content in molten paraffin wax. The refractive index of each of these blends was determined at 60° C. and the data were summarized as follows:

| Mol. wt. of copolymer | Refr. Index of Blends (at 60° C.) | |
|---|---|---|
| | 12,000 | 78,000 |
| Percent copolymer in wax: | | |
| 0 | 1.4370 | 1.4370 |
| 10 | 1.4421 | 1.4425 |
| 20 | 1.4480 | 1.4491 |
| 40 | 1.4612 | 1.4600 |

EXAMPLE 7

A series of tests was made to show the effect of various amounts, less than 5%, of styrene in the copolymerization with isobutylene, at −103° C., using 2 volumes of methyl chloride as solvent per volume of active olefin feed, and using as catalyst a solution of 0.28 gram of $AlCl_3$ in methyl chloride. The molecular weights of the copolymers obtained, in comparison with plain polybutene made under similar conditions, are shown in the following table:

| Sample No. | Percent styrene in feed | Mol. wt. of polymeric product (Staudinger method) |
|---|---|---|
| 1 | 0 | 221,000 |
| 2 | 1 | 138,000 |
| 3 | 3 | 118,000 |
| 4 | 4 | 86,000 |
| 5 | 4.5 | 77,000 |

The above data show that when 1% of styrene is copolymerized with isobutylene the molecular weight of the product is lowered about 40% but larger amounts of styrene up to 4 or 4.5% only make relatively small further reductions in the molecular weight of the resulting copolymers. On the other hand, the presence of the 1 to 4% or so of styrene in the copolymer effects a great improvement in the stability of the copolymer against molecular weight breakdown when subjected either to mechanical shear, elevated temperature or oxygen.

For instance, the following mill stability tests show that the above-described copolymers having from 1 to 4.5% of combined styrene suffer much lower breakdown in molecular weight than a polybutene made under the same polymerization conditions. In this series of tests in which the polymer was milled on a pair of steel rolls such as commonly used for hot milling rubber, the mill clearance used was 0.015 inch and the mill temperature was 305° F. Samples were taken every 10 mins. up to 1 hour.

*Mill stability tests*
[Molecular weights at different milling times.]

| Percent Styrene in Feed | Minutes | | | | | | |
|---|---|---|---|---|---|---|---|
| | 0 | 10 | 20 | 30 | 40 | 50 | 60 |
| 0 | 221,000 | 138,000 | 100,000 | 85,500 | 56,880 | 32,790 | 25,207 |
| 1 | 138,000 | 102,780 | 97,895 | 63,450 | 60,000 | 40,000 | 39,000 |
| 3 | 118,000 | 102,000 | 97,000 | 63,000 | 40,000 | 38,000 | 39,000 |
| 4 | 86,230 | 86,000 | 86,000 | 82,400 | 82,400 | 82,100 | 51,930 |
| 4.5 | 77,000 | 74,000 | 70,000 | 68,000 | 60,080 | 59,000 | 58,200 |

The above data show that the plain polybutene broke down from a molecular weight of 221,000 to about 25,000 and thus retained only 11.4% of the original molecular weight, whereas the copolymer with even as little as 1% of styrene broke down from 138,000 to only 39,000, thereby retaining 28.2% of its original molecular weight. This is a 247% improvement as compared to the 11.4% molecular weight retention of the plain polybutene. Making similar calculations for the other data in the above table, the relative improvements are tabulated as follows:

| Percent styrene in feed | Percent Mol. Wt. retained | Percent improvement over polybutene | Percent improvement over polybutene, for each 1% styrene in copolymer |
|---|---|---|---|
| 0 | 11.4 | | |
| 1 | 28.2 | 247 | 247 |
| 3 | 33.0 | 290 | 97 |
| 4 | 60.5 | 531 | 133 |
| 4.5 | 75.5 | 662 | 147 |

These calculations on the relative improvements indicate that the greatest proportionate improvement is obtained with the first per cent of styrene, and that although subsequent further additions of styrene in the polymerization feed effect further improvements in the molecular weight retention during milling, such subsequent additions of styrene are relatively less effective when compared on the basis of the amount of styrene used. It is also significant that as little as 4.5% of styrene in the feed produces about 75% mol. wt. retention, so that obviously much larger amounts of styrene such as 20% or 50% could not possibly effect a much greater improvement in mol. wt. retention than is obtained with this still relatively minute amount of 4.5%.

It is believed that these data show that within the range of very small proportions of styrene, i. e. from 0.5 to 4.5% styrene, the small amount of styrene monomer has two effects on the polymerization of the isobutylene monomer. One is that it reduces the molecular weight, and the other is that it affects the molecular weight distribution, tending to give a narrower spread in the range between the polymer molecules having the highest molecular weight and those of the lowest molecular weight formed under many particular conditions. It is believed that this helps to account for the improved stability obtained by the copolymers of the low styrene content of this invention.

EXAMPLE 8

4.5% by weight of styrene was copolymerized with 95.5% of isobutylene at −101.3° C., using 2 volumes of methyl chloride as solvent per volume of active olefin feed, and using as catalyst $AlCl_3$ in $CH_3Cl$ solution. The yield of the copolymer was 64% (dry weight) and its molecular weight was 82,000 (by Staudinger method). This copolymer had a Williams plasticity of 207 and a recovery of 87. It also had a tensile strength of 58 lbs./sq. in. and an elongation of 1725%. These characteristics indicate that this copolymer more nearly resembles the high molecular weight elastic or rubbery polybutenes (e. g. having a molecular weight of 150,000 or so) than the resinous or plastic styrene-isobutylene copolymers which contain 30 or 50% or so of styrene, but compared to polybutene this copolymer containing 4.5% of styrene has much better stability against mechanical breakdown, heat and sunlight.

EXAMPLE 9

4.0% by weight of methyl p-methyl styrene was copolymerized with 96% of isobutylene at −101.3° C., using 2 volumes of methyl chloride as solvent per volume of active olefin feed and using as catalyst $AlBr_3$ in $CH_3Cl$ solution (1% solution). The yield of the copolymer was 49% (dry wt.) and its molecular weight was 69,000 (Staudinger). This copolymer had a tensile of 50 lbs./sq. in. and an elongation of 1840%. The polymer was soluble in diisobutylene, benzene, and toluene.

EXAMPLE 10

A polymerization feed of 3% by weight of styrene and 97% by weight of isobutylene was diluted with 3 volumes of liquid propane per volume of reactants and polymerized at −40° C. using $BF_3$ gas as catalyst, the amount of $BF_3$ used being about 0.3%, on the weight of polymerization feed. The yield of copolymer was about 80%, and it had an average molecular weight of about 24,000, by the Staudinger method. This product is of value as an adhesive and as a V. I. improver in lubricating oils.

EXAMPLE 11

A polymerization feed was formulated by blending 1 part by weight of styrene with 99 parts by weight of isobutylene. To this mixture in a Dewar flask was added 1000 grams of powdered $CO_2$. To this mixture was added 150 ml. of catalyst solution containing 0.3 gram $AlBr_2Cl$/100 ml. of liquid butane. After the reaction, the product was removed, washed, and dried. The yield was 33%. The polymer was slightly yellow. The intrinsic viscosity of the polymer was 0.864, and the molecular weight (Staudinger) was about 27,000. This copolymer was blended in several concentrations with a solvent extracted paraffinic lubricating oil base stock and tested for viscosity and V. I. (Viscosity Index) characteristics with the following results:

| Percent Polymer | Viscosity (cs.) | | V. I. of Blend |
|---|---|---|---|
| | At 100° F. | At 210° F. | |
| 1 | 61.22 | 9.38 | 131.2 |
| 3 | 169.54 | 24.51 | 137.0 |
| 10 | 1802.7 | 204.5 | 125.2 |

As the V. I. of the lubricating oil base stock was 112, it is apparent that the small additions of 1% and 3% of the copolymer effected a very substantial increase in the V. I. up to 131 and 137 respectively.

EXAMPLE 12

A copolymer of about 4% by weight of styrene and 96% of isobutylene was made at −25° C. in methyl chloride diluent, using as catalyst a solution of aluminum chloride in methyl chloride. The yield of copolymer was about 90% and the average molecular weight by the Staudinger method was about 10,435.

This copolymer was then used as plasticizer for a GR-S (75% butadiene, 25% styrene) type of synthetic rubber, and tested for various physical properties before and after curing. For comparison, some of the unplasticized synthetic rubber was also tested. The compounding recipe used was as follows:

| | Parts/wt. |
|---|---|
| GR-S | 100 |
| ZnO | 5 |
| Carbon black (EPC) | 45 |
| Sulfur | 1.5 |
| Monex | 0.4 |
| Plasticizer | 10 |

*Properties before curing*

| | Control | Plasticized |
|---|---|---|
| Williams Plasticity-Recovery (5 Kg. at 70° C | 123–16 | 108–14. |
| Mooney at 212° F.,1½' | 64 | 49. |
| Extrusions: | | |
| Ins./Min | 36.25 | 44.20. |
| Gms./Min | 79.80 | 96.05. |
| Gms./Inch | 2.20 | 2.15. |
| Tack | Very slight | Fair. |

These blends were then cured at 287° F. and were tested for physical properties after various curing times from 15 minutes to 60 minutes, with the following results:

| Time of Curing (Min.) | Tensile-Elongation Mod. at 300%—Shore | |
|---|---|---|
| | Control | Plasticized |
| 15 | 190–170 / 90–45 | 125–900 / 60–50 |
| 30 | 2,510–590 / 890–55 | 2,080–670 / 590–54 |
| 45 | 2,900–570 / 1,160–60 | 2,420–600 / 830–54 |
| 60 | 3,000–540 / 1,260–60 | 2,530–600 / 860–55 |

The above data showed that before curing, the new copolymer plasticizer was efficient as a processing aid and greatly increased the extrusion rate, as well as improving the tack. The tests after curing showed a slight reduction in tensile strength, modulus, and Shore hardness, and a slight increase in elongation in the plasticized blends. These are satisfactory results for the use of 10% of plasticizer.

This application is a continuation-in-part of application Serial No. 656,148 filed March 21, 1946, now Patent 2,609,359.

It is not intended that this invention be limited to the specific materials which have been mentioned merely for the sake of illustration but only by the appended claims in which it is intended to claim all novelty inherent in the invention as well as all modifications coming within the scope and spirit of the invention.

What is claimed is:

1. The process of preparing substantially saturated rubbery copolymers having an average molecular weight above 30,000, which consists in copolymerizing about 0.5 to 4.5% by weight of styrene with about 95.5 to 99.5% of isobutylene in the presence of about 2 to 3 volumes of methyl chloride as solvent per volume of mixed reactants, and using as catalyst a solution of aluminum chloride in methyl chloride, said process being carried out at a temperature between about —50° C. and —150° C.

2. A product consisting of essentially a rubbery substantially saturated two-component copolymer of more than 95% of isobutylene and at least about 0.5% but less than 5% of styrene, said copolymer having an average molecular weight of at least 30,000, and being soluble in highly paraffinic lubricating oils at temperatures as low as 10° C. and being soluble in benzene at 20° C.

3. Product according to claim 2 having an average molecular weight of at least 50,000.

4. A two-component product consisting essentially of a copolymer of 97% by weight of isobutylene and 3% of styrene, said copolymer having an average molecular weight of about 33,000 and being soluble in benzene at temperatures as low as 20° C.

5. The process which comprises copolymerizing a mixture consisting essentially of at least about 0.5% but less than 5% by weight of styrene, with at least 95% by weight of an isoolefin having 4 to 5 carbon atoms, there being no aliphatic polyenes present in the reaction mixture, at a temperature below 0° C., with a Friedel-Craft catalyst.

6. Process according to claim 5 carried out in the presence of a Friedel-Craft catalyst promoted by a small amount of an ether.

7. Process according to claim 5 catalyzed by a solution of aluminum chloride in a lower alkyl halide of 1 to 2 carbon atoms.

8. Process according to claim 5 carried out in the presence of 1 to 5 volumes of inert solvent per volume of mixed reactants.

9. A product consisting essentially of a copolymer of more than 95% by weight of an isoolefin having 4 to 5 carbon atoms and at least about 0.5% but less than 5% by weight of styrene, and having no aliphatic polyenes copolymerized therein.

10. A product consisting of a copolymer of more than 95% by weight of an isoolefin having 4 to 5 carbon atoms and at least about 0.5% but less than 5% by weight of styrene.

WILLIAM J. SPARKS.
DAVID W. YOUNG.

References Cited in the file of this patent

UNITED STATES PATENTS

| Number | Name | Date |
|---|---|---|
| 2,274,749 | Smyers | Mar. 3, 1942 |
| 2,384,916 | Holmes | Sept. 18, 1945 |
| 2,446,536 | Hardy | Aug. 10, 1948 |
| 2,609,359 | Sparks | Sept. 2, 1952 |